(12) United States Patent
Cardin et al.

(10) Patent No.: US 9,054,510 B2
(45) Date of Patent: Jun. 9, 2015

(54) UTILITY METER SOCKET AND CONDUIT AND METHOD OF INSTALLATION

(71) Applicant: Thomas & Betts International, Inc., Wilmington, DE (US)

(72) Inventors: Daniel Cardin, Sainte-Julie (CA); Marie-Ève Bernard, St-Jean-Sur-Richelieu (CA); Benoît Orban, Saint-Lambert (CA); Patrick Mainville, Montréal (CA); Daniel Lalancette, St-Jean-Sur-Richelieu (CA)

(73) Assignee: Thomas & Betts International, Inc., Wilmington, DE (US)

( * ) Notice: Subject to any disclaimer, the term of this patent is extended or adjusted under 35 U.S.C. 154(b) by 75 days.

(21) Appl. No.: 13/839,045

(22) Filed: Mar. 15, 2013

(65) Prior Publication Data

US 2013/0256025 A1 Oct. 3, 2013

Related U.S. Application Data

(60) Provisional application No. 61/619,634, filed on Apr. 3, 2012.

(51) Int. Cl.
*H02G 3/04* (2006.01)
*H02G 3/08* (2006.01)

(52) U.S. Cl.
CPC ..................................... *H02G 3/083* (2013.01)

(58) Field of Classification Search
USPC ............. 174/38, 535, 68.1, 72 A, 72 C, 68.3; 52/287.1
See application file for complete search history.

(56) References Cited

U.S. PATENT DOCUMENTS

| 3,158,679 | A | 11/1964 | Ware |
| 3,361,938 | A | 1/1968 | Watson |
| 3,502,785 | A | 3/1970 | Nickola |
| 3,524,477 | A | 8/1970 | Steger |
| 3,614,538 | A | 10/1971 | Nickola |

(Continued)

FOREIGN PATENT DOCUMENTS

| CA | 2062256 | 9/1993 |
| CA | 2311518 A1 | 6/1999 |

(Continued)

OTHER PUBLICATIONS

Non-Final Office Action issued in co-pending Canadian Patent Application No. 2,811,751 on Jul. 25, 2014.

*Primary Examiner* — Dhirubhai R Patel
(74) *Attorney, Agent, or Firm* — Snyder, Clark, Lesch & Chung, LLP

(57) ABSTRACT

A system may include a load-side conduit including a plurality of punch-outs for passing utility wires to a building. The system may also include a utility box having an opening to receive the load-side conduit. The utility box receives utility wires from a utility-side conduit. In one embodiment, the load-side conduit may include a plurality of mounting flanges for suspending the load-side conduit from the utility box. In one embodiment, the load-side conduit includes a mounting strap, attached to the load-side conduit, for mounting the load-side conduit onto a building. In one embodiment, the load-side conduit includes a body and a cover. The body may include locking flanges and the cover may include hooks to engage the locking flanges to secure the cover to the body.

21 Claims, 17 Drawing Sheets

(56) References Cited

U.S. PATENT DOCUMENTS

| | | |
|---|---|---|
| 3,691,288 A | 9/1972 | Sturdivan |
| 3,761,603 A * | 9/1973 | Hays et al. .................... 174/101 |
| 3,796,822 A * | 3/1974 | Eickman ........................ 174/503 |
| 3,868,080 A | 2/1975 | Olson |
| 3,879,641 A | 4/1975 | Byrd |
| 3,936,589 A | 2/1976 | Teeters |
| 3,996,415 A | 12/1976 | Provorse |
| RE31,359 E | 8/1983 | Nickola |
| 4,723,580 A | 2/1988 | Trautwein |
| 4,864,467 A | 9/1989 | Byrd |
| 4,887,187 A | 12/1989 | Nickola |
| 4,977,482 A | 12/1990 | Langdon |
| 5,304,736 A | 4/1994 | Halfacre |
| 5,377,074 A | 12/1994 | Byrd |
| 5,400,212 A | 3/1995 | Hanson |
| 5,424,895 A * | 6/1995 | Gaston ............................ 361/46 |
| 5,523,529 A | 6/1996 | Holliday |
| 5,614,695 A | 3/1997 | Benito Navazo |
| 5,627,719 A * | 5/1997 | Gaston .......................... 361/103 |
| 5,804,769 A | 9/1998 | Morena |
| 5,973,264 A | 10/1999 | O'Connor |
| 6,180,878 B1 | 1/2001 | Gretz |
| 6,247,500 B1 | 6/2001 | McMahon |
| 6,274,814 B1 * | 8/2001 | Iavarone ...................... 174/68.3 |
| 6,323,421 B1 | 11/2001 | Pawson et al. |
| 6,437,247 B1 | 8/2002 | Holliday |
| 6,646,203 B1 | 11/2003 | Liao |
| 7,022,912 B1 * | 4/2006 | Kilburn ........................... 174/50 |
| 7,038,133 B2 * | 5/2006 | Arai et al. .................... 174/72 A |
| 7,085,128 B2 | 8/2006 | Wilfong |
| 7,385,148 B2 | 6/2008 | Picard |
| 7,612,300 B2 * | 11/2009 | Owens et al. ................. 174/480 |
| 7,615,710 B2 * | 11/2009 | Sayres ........................ 174/480 |
| 7,819,676 B1 | 10/2010 | Cardoso et al. |
| 8,253,040 B2 * | 8/2012 | Hopkins ....................... 174/503 |

FOREIGN PATENT DOCUMENTS

| | | |
|---|---|---|
| CA | 2270761 A1 | 11/1999 |
| CA | 2074971 C | 7/2002 |
| CA | 2436283 A1 | 2/2004 |
| CA | 101947 | 7/2004 |
| CA | 101986 | 7/2004 |
| CA | 2556355 A1 | 9/2005 |
| CA | 107079 | 12/2005 |
| CA | 136298 | 2/2011 |
| CA | 136299 | 2/2011 |

* cited by examiner

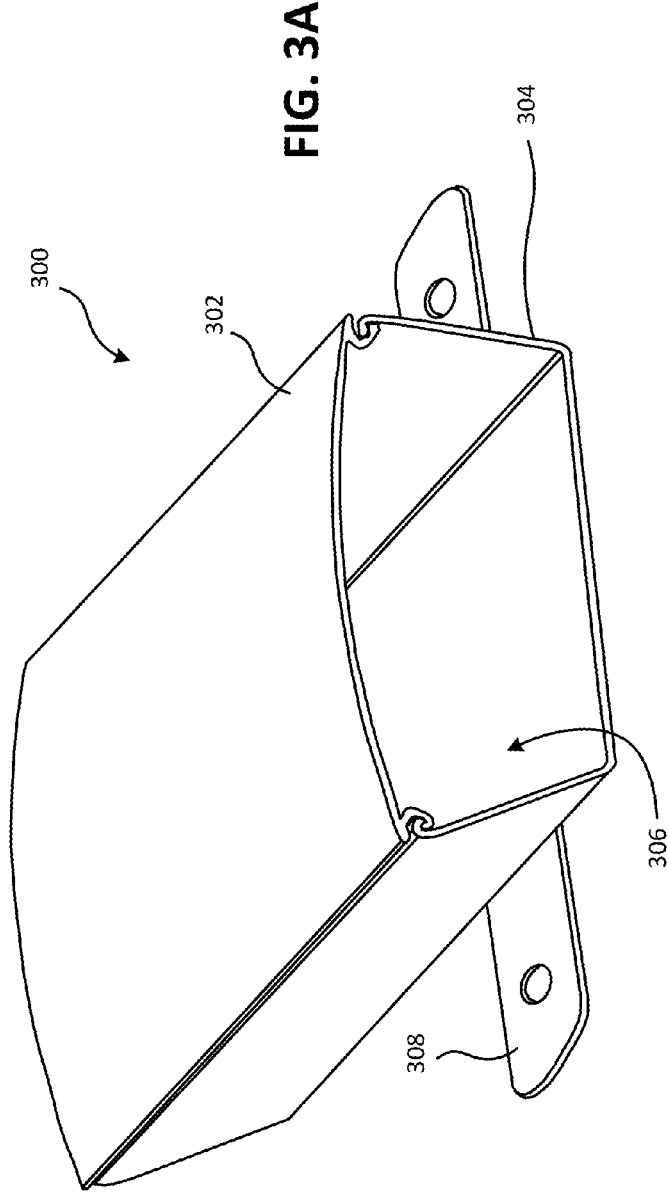
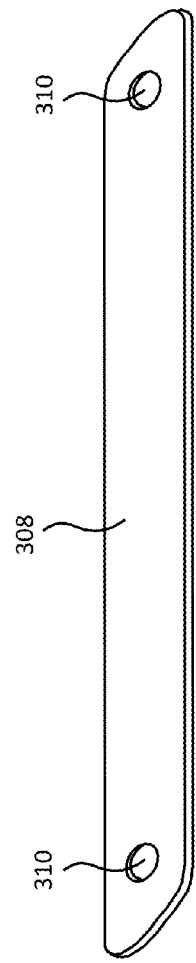
FIG. 3A
FIG. 3B

UTILITY METER SOCKET AND CONDUIT AND METHOD OF INSTALLATION

RELATED APPLICATIONS

The patent application claims priority to and the benefit of U.S. Provisional Patent Application No. 61/619,634 filed Apr. 3, 2012, which is incorporated by reference herein.

BACKGROUND OF THE INVENTION

The present invention relates generally to a mounting apparatus called a "meter socket" for utility service meters. A meter socket is sometimes mounted on the face of a building (e.g., a home) prior to the completion of the construction of the building so that a utility service line (underground or overhead) may be connected to the meter. In most cases, a meter socket may be mounted on the face of a building after the completion of the construction.

BRIEF DESCRIPTION OF THE DRAWINGS

FIG. 3A is an isometric projection drawing of a section of conduit in one embodiment;
FIG. 3B illustrates the mounting strap of FIG. 3A.

DETAILED DESCRIPTION

Figure 1B:
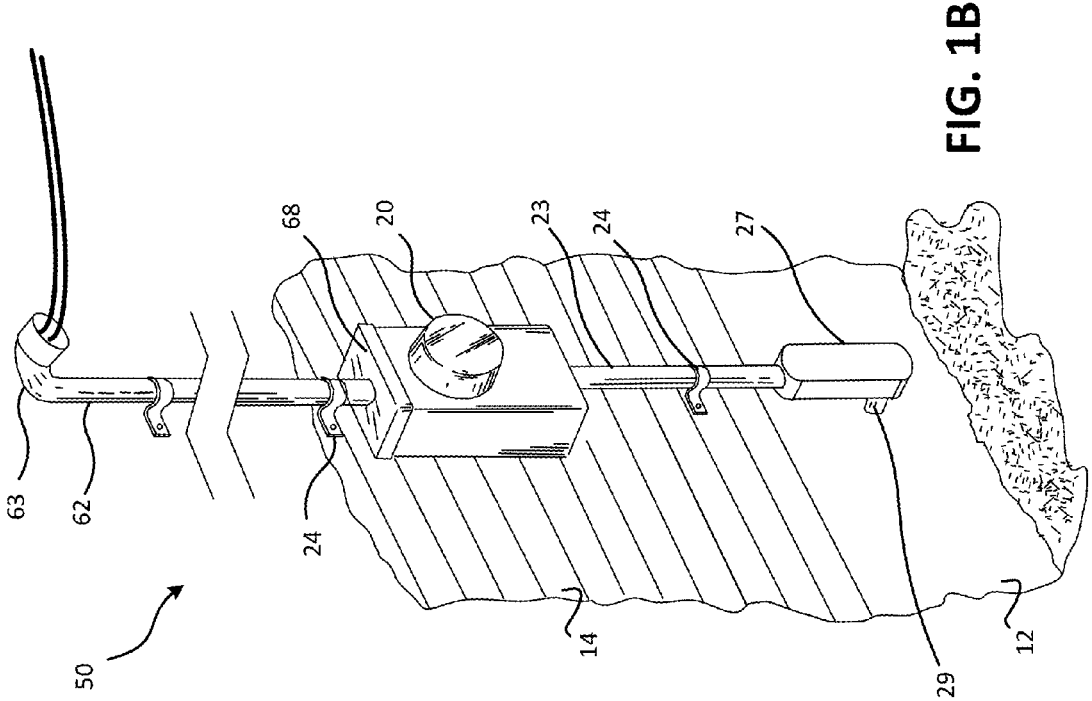
FIGS. 1A and 1B illustrate utility meter sockets.
Figure 1A:
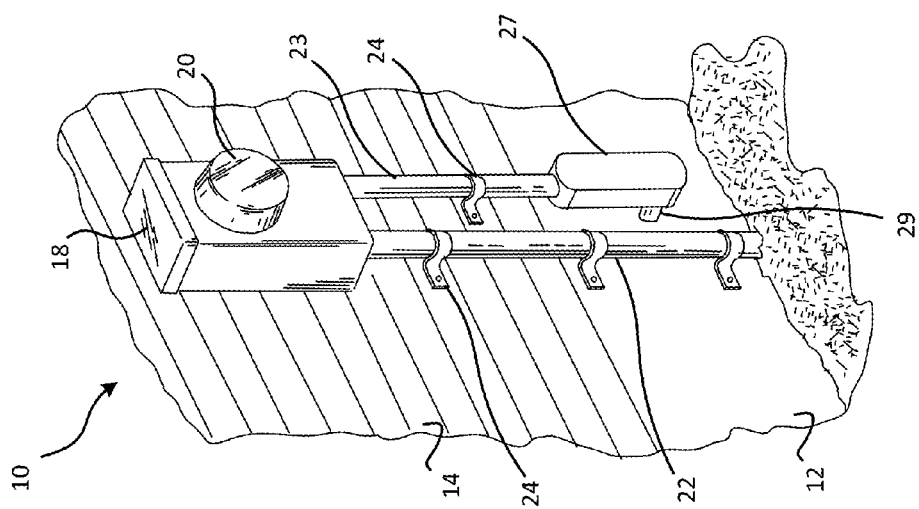

FIG. 1A illustrates a utility meter socket 10. Socket 10 is mounted on a poured concrete foundation 12 of a building, the exterior walls of which are covered with siding 14 (e.g., vinyl or fiber cement board). A utility meter box 18 (e.g., made of metal) is mounted on siding 14 of the building to hold a utility meter having a glass face 20, which protrudes forward through the front box 18. A conduit 22 (e.g., plastic or metallic) carries the utility service line (e.g., electrical service line) from an underground utility to utility box 18. Conduit 22 may be secured to the building (e.g., through siding 14) by one or more straps 24. Another conduit 23 extends from box 18 to a conduit fitting (or "conduit junction box") 27. Conduit 23 carries the utility line from box 18 into the building. From conduit fitting 27, another conduit 29 carries the utility line into the building.

FIG. 1B illustrates a utility meter socket 50. Like socket 10, socket 50 is mounted on a poured concrete foundation 12 of a building, the exterior walls of which are covered with siding 14 (e.g., vinyl, fiber cement board, brick, etc.). A utility meter box 68 (e.g., made of metal) is mounted on siding 14 of the building to hold a utility meter having a glass face 20, which protrudes forward through the front box 68. A conduit 62 (e.g., plastic or metallic) carries the utility service line (e.g., electrical service line) from an overhead (e.g., aboveground) utility to utility box 68. As shown in FIG. 1A, an entrance cap 63 may receive the utility line from, for example, a utility pole. Conduit 62 may be secured to the building (e.g., through siding 14) by one or more straps 24. As with box 18, another conduit 23 extends from box 68 to a conduit fitting 27. Conduit 23 carries the utility line from box 18 to conduit fitting 27. From conduit fitting 27, another conduit 29 carries the utility line into the building.

When installing meter socket 10 or meter socket 50, the installer may measure the distance between box 18 (or box 68) and the desired location of conduit fitting 27. In this case, the meter socket installer then cuts conduit 23 to the appropriate length. The meter socket installer may then connect conduit 23 to conduit fitting 27 using, for example, adhesive or other fastening means. The meter socket installer may also connect conduit 23 to box 18 (or box 68) using adhesive or other fastening means. The meter socket installer may then use straps 24 to secure conduit 23 to the building. The meter socket installer must also thread the utility cables, wires, etc. through conduits 22, 23, and/or 62. In the configuration shown in FIGS. 1A and 1B, conduits 22, 23, and 62 are closed but for the end openings that are connected to conduit fitting 27, box 18, box 68, and/or entrance cap 63. Threading the utility cable, wires, etc., may be challenging.

In some instances, meter socket 10 and meter socket 50 may be assembled and attached to the building before siding 14 is attached to the building. In this case, the siding installer may remove straps 24 and install the siding behind conduits 22, 23, and/or 62. The siding installer then must reattach straps 24 (e.g., preferably in the same location) after installing siding 14. Finding the proper placement for straps 24 may be challenging.

Figure 2B:
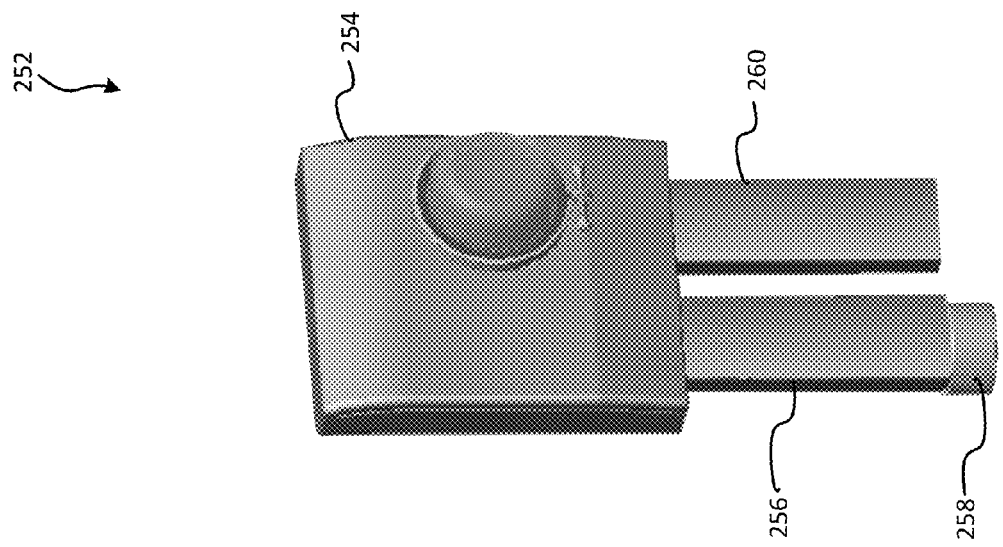
FIG. 2B illustrates a utility meter socket in another embodiment.
Figure 2A:
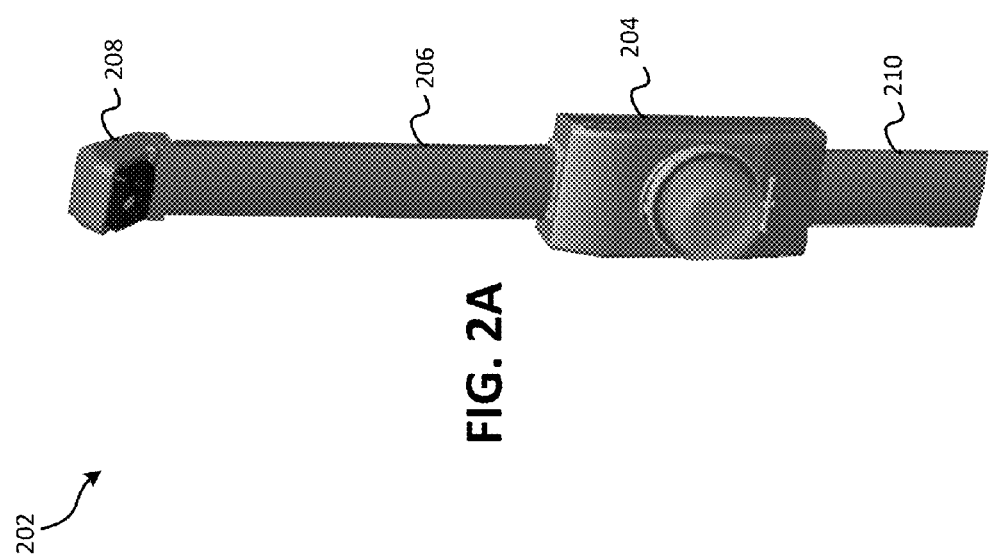
FIG. 2A illustrates a utility meter socket in one embodiment.

FIG. 2A illustrates a utility meter socket 202. Like meter socket 10, meter socket 202 may be attached to the side of a building, for example. Meter socket 202 includes a utility meter box 204, a mast 206 (e.g., utility-side conduit 206), an entrance cap 208, and a load-side conduit 210. An electrical service line may enter entrance cap 208, travel through mast 206, to meter box 204. An electrical service line may travel from meter box 204 through load-side conduit 210 and into the building to which meter socket 202 is attached.

FIG. 2B illustrates a utility meter socket 252. Like meter socket 10 and meter socket 202, meter socket 252 includes a utility meter box 254, a utility-side conduit 256, an underground (e.g., subterranean) conduit 258, and a load-side conduit 260. An electrical service line may enter utility-side conduit from underground conduit 258 and travel to meter box 254. An electrical service line may then travel from meter box 254 through load-side conduit 260 and into the building to which meter socket 252 is attached.

FIG. 3A is an isometric projection drawing of a section 300 of conduit, such as mast 206, load-side conduit 210, utility-side conduit 256, or load-side conduit 260. Section 300 includes a cover 302 and a body 304 that form a channel 306 through section 300 of conduit. Channel 306 may carry utility wires, for example, to power a building. A mounting strap 308 may be attached to body 304. In one embodiment, mounting strap 308 may be spot welded to body 304. In another embodiment, strap 308 may be glued to body 304. As shown in FIG. 3B, strap 308 includes holes 310. A fastener may pass through holes 310 for attaching section 300 to a building, for example.

Figure 3C:
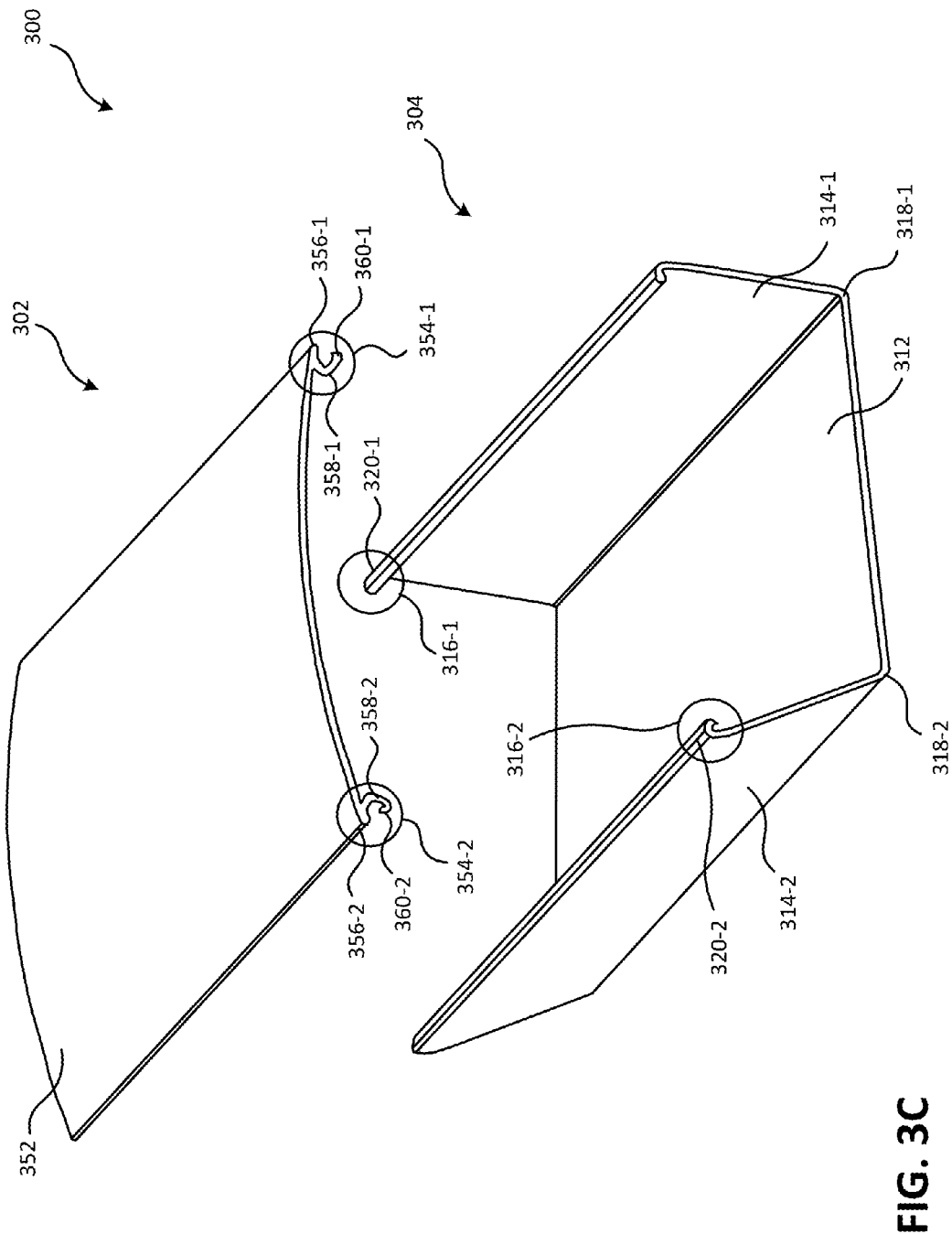
FIG. 3C is an isometric projection drawing of the section of conduit shown in FIG. 3A.

FIG. 3C is an isometric projection drawing of section 300 of conduit, with cover 302 and body 304 in an unassembled configuration. Body 304 includes a base portion 312, a first side wall 314-1 and a second side wall 314-2 (collectively, "side walls 314"). Base portion 312 and side walls 314 form three sides of channel 306 (shown in FIG. 3A). Side walls 314 may extend outward from base portion 312 (e.g., forming an obtuse angle between each of side walls 314 and base portion 312. At the top of first side wall 314-1 is a first inwardly-facing locking flange 316-1 and, likewise, at the top of second side wall 314-2 is a second inwardly-facing locking flange 316-2 (collectively, "flanges 316").

Body 304 (including base portion 312, side walls 314, and flanges 316) may be formed from a single piece of material, such as a single piece of sheet metal, that is folded and bent at junctions 318-1 (between first side wall 314-1 and base portion 312), junction 318-2 (between second side wall 314-2 and base portion 312), junction 320-1 (between first side wall 314-1 and first flange 316-2), and junction 320-2 (between second side wall 314-2 and second flange 316-2). In another embodiment, body 304 may be formed of separate pieces of material (e.g., pieces of sheet metal welded together). In another embodiment, body 304 may be formed of plastic, for example.

Cover 302 may include a top portion 352, a first hook 354-1 and a second hook 354-2 (collectively, "hooks 354"). Top portion 352 may be rounded for aesthetics. As described in more detail below, hooks 354 may cooperate with flanges 316 in such a way that cover 302 attaches to body 304. Hooks 354 may extend inward and away from edges 356 of top portion 352 and then bend back toward edges 356 in the outward and downward directions. Cover 302 (top portion 352 and hooks 354) may be formed from a single piece of material, such as a single piece of sheet metal, that is folded and bent at edge 356-1 (between top portion 352 and hook 354-1) and edge 356-2 (between top portion 352-2 and hook 354-2). Hook 354-1 may also be bent at a portion 358-1 so that hook 354-1 bends downward and outward. Likewise, hook 354-2 may also be bent at a portion 358-2 so that hook 354-2 bends downward and outward. In one embodiment, hook 354-2 may be also bend upward (e.g., at portion 360-2) for better engagement with flange 316-2. Likewise, hook 354-1 may also bend upward (e.g., at portion 360-1) for better engagement with flange 316-1.

An operator may lower cover 302 onto body 304. In this case, hooks 354 may engage with flanges 316. Additional pressure on cover 302 may cause side walls 314 to move in the outward direction, allowing hooks 354 to pass below flanges 316 such that the assembled (e.g., locked) configuration as shown in FIG. 3A is achieved. Alternatively, or in addition, to side walls 314 moving in the outward direction when cover 302 is pressed onto body 304, flanges 316 may also be compressed toward side walls 314 (e.g., at junctions 320) allowing hooks 354 to pass flanges 316 (e.g., allowing hooks 352 to latch onto flanges 316). Further, hooks 354 may also bend in the inward direction (e.g., at portions 358), allowing hooks 354 to pass flanges 316 (e.g., allowing hooks 352 to latch onto flanges 316).

Figure 4A:
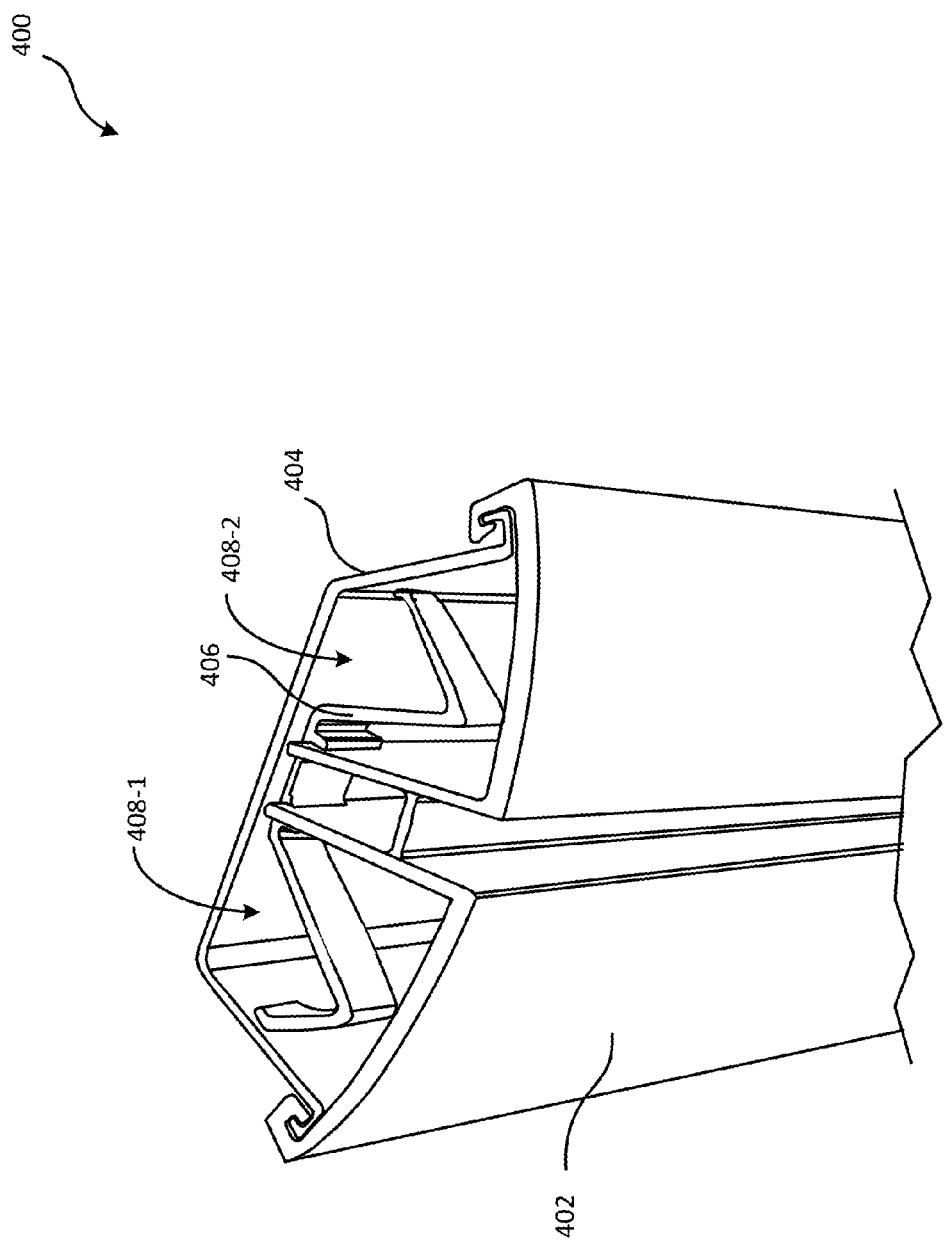
FIG. 4A is a drawing of a section of conduit in another embodiment.

FIG. 4A is a projection drawing of a section 400 of conduit in another embodiment. Section 400 may form part of mast 206, load-side conduit 210, utility-side conduit 256, or load-side conduit 260. Section 400 may include a cover 402, a body 404, and a wire strap 406 shown in an assembled configuration. Body 404 and cover 402 form two channels 408-1 and 408-2 (collectively, "channels 408") through section 400 of conduit. Channels 408 may carry utility wires, for example, to power a building. Wire strap 406 may hold such wires in channels 408 during assembly, for example.

Figure 4B:
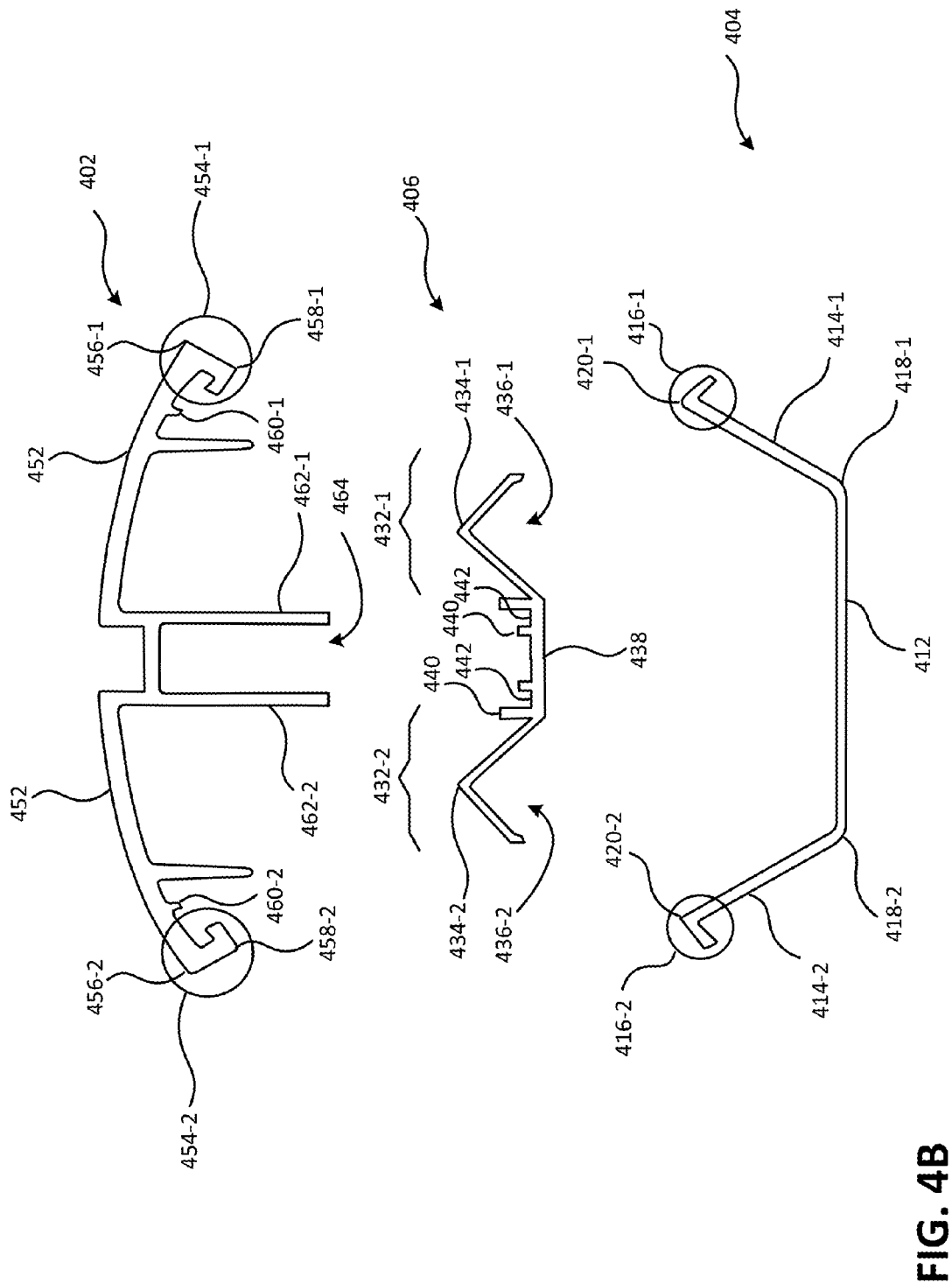
FIG. 4B is a cross-sectional drawing of the section of conduit shown in FIG. 4A.

FIG. 4B is a cross-sectional drawing of section 400 of conduit, with cover 402, body 404, and wire strap 406 in an unassembled configuration. Body 404 includes a base portion 412 a first side wall 414-1 and a second side wall 414-2 (collectively, "side walls 414"). Base portion 412 and side walls 414 form the sides of channel 408 (shown in FIG. 4A). Side walls 414 may extend outward from base portion 412 (e.g., forming an obtuse angle between each of side walls 414 and base portion 412). At the top of first side wall 414-1 is a first outwardly-facing locking flange 416-1 and, likewise, at the top of second side wall 414-2 is a second outwardly-facing locking flange 416-2 (collectively, "flanges 416").

Body 404 (including base portion 412, side walls 414, and flanges 416) may be formed from a single piece of material, such as a single piece of sheet metal, that is folded and bent at junctions 418-1 (between first side wall 414-1 and base portion 412), junction 418-2 (between second side wall 414-2 and base portion 412), junction 420-1 (between first side wall 414-1 and first flange 416-2), and junction 420-2 (between second side wall 414-2 and second flange 416-2). In another embodiment, body 404 may be formed of separate pieces of material (e.g., pieces of sheet metal welded together). In one embodiment, body 404 may be formed of plastic, for example.

Although only one strap 406 is shown in FIG. 4A, a conduit may have straps 406 positioned periodically along channels 408. In one embodiment, straps 406 may be glued to body 404. In another embodiment, straps 406 may be secured to body 404 by a screw that passes through strap 406 and body 404 to secure section 400 to a building. As shown in FIG. 4B, strap 406 includes a first arm 432-1 having a first elbow 434-1, under which a space 436-1 is formed to secure wires, cables, etc. in first channel 408-1. Strap 406 also includes a second arm 432-2 having a second elbow 434-2, under which a space 436-2 is formed to secure wires, cables, etc. in second channel 408-2. Strap 406 also includes a base portion 438 including a surface to engage the base portion 412 of body 404. Strap 406 may be secured to body 404, for example, by glue (e.g., in the case of plastic body 404 and strap 406), spot welding (e.g., in the case of metal body 404 and strap 406), or a fastener (e.g., a screw securing strap 406 to body 404 and body 404 to a building). Strap 406 may also include protrusions 440 that form grooves 442 to engage protrusions from cover 402 (discussed below) that separate first channel 408-1 from second channel 408-2 in portion 400.

Cover 402 may include a top portion 452, a first hook 454-1 and a second hook 454-2 (collectively, "hooks 454"). Top portion 452 may be rounded for aesthetics. As described in more detail below, hooks 454 may cooperate with flanges 416 in such a way that cover 402 attaches to body 404. Hooks 454 may extend downward from edges 456 of top portion 452 and then bend inward. In one embodiment, cover 402 (top portion 452 and hooks 454) may be formed from a single piece of material, such as a single piece of sheet metal, that is folded and bent at edge 456-1 (between top portion 452 and hook 454-1) and edge 456-2 (between top portion 452 and hook 454-2). Hook 454-1 may also be bent at a portion 458-1 so that hook 454-1 bends downward and inward. Likewise, hook 454-2 may also be bent at a portion 458-2 so that hook 454-2 bends downward and inward.

In one embodiment, cover 402 may also include protrusions 460 that engage flanges 416 (e.g., at portions 420) so as to make disassembly of body 404 from cover 402 more difficult. In one embodiment, cover 402 may include legs 462 that separate channel 408-1 from channel 408-2. In this embodiment, legs may sit in grooves 442 when cover 402, wire strap 406, and body 402 are assembled, as shown in FIG. 4A. Legs 462 form a passage 464 through which a fastener (e.g., a screw) may pass from top portion 452 through base portion 412 body 402 to secure section 400 to a building. In one embodiment, strap 406 may attach to cover 402 with a friction fit with legs 462 in grooves 442.

An operator may lower cover 402 onto body 404. In this case, hooks 454 may engage with flanges 416. Additional pressure on cover 402 may cause side walls 414 to move in the inward direction, allowing hooks 454 to pass below flanges 416 such that the assembled (e.g., locked) configuration as shown in FIG. 4A is achieved. Alternatively, or in addition, to side walls 414 moving in the outward direction when cover 402 is pressed onto body 404, flanges 416 may also be compressed toward side walls 414 (e.g., at junctions 420) allowing hooks 454 to pass flanges 416 (e.g., allowing hooks 454 to latch onto flanges 416). Further, hooks 454 may also bend in the inward direction (e.g., at portions 458), allowing hooks 454 to pass flanges 416 (e.g., allowing hooks 454 to latch onto flanges 416). Further, cover 402 may flex (e.g., reducing the curvature of cover 402) to extend the length of cover 402. Such flexing may also allow hooks 454 to pass flanges 416 (e.g., allowing hooks 454 to latch onto flanges 416).

Figure 5A:
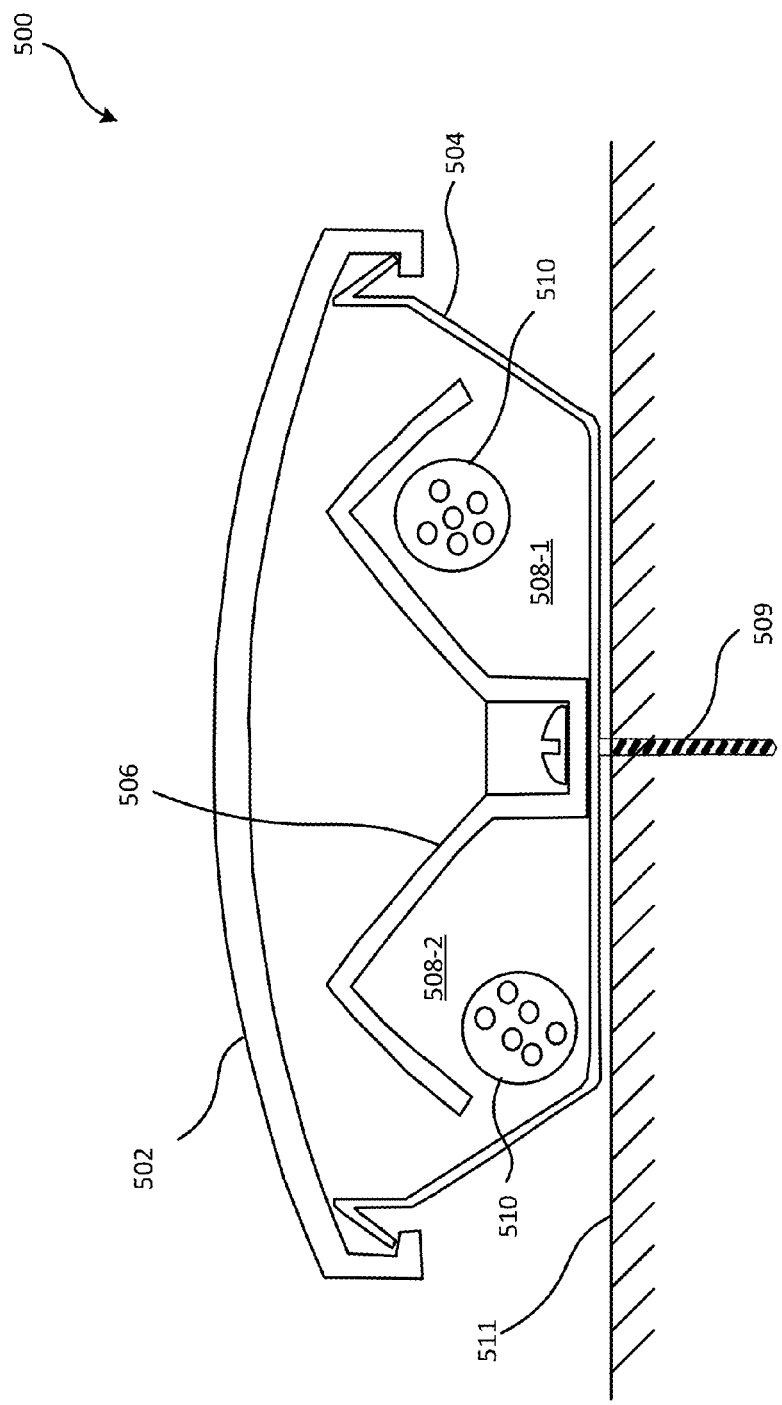
FIG. 5A is a cross-sectional drawing of a section of conduit in another embodiment.

FIG. 5A is cross-sectional drawing of a section 500 of conduit in an assembled configuration. Section 500 may be part of mast 206, load-side conduit 210, utility-side conduit 256, or load-side conduit 260. Section 500 may include a cover 502, a body 504, and a wire strap 506. Body 504, cover 502, and strap 506 form two channels 508-1 and 508-2 (collectively, "channels 508) through section 500 of conduit. Channels 508 may carry utility wires 510, for example, to power a building 511. Wire strap 506 may hold wires 510 in channels 508 during assembly, for example. A fastener 509 (e.g., a screw) secures strap 506 to body 504 and body 504 to building 511.

Figure 5B:
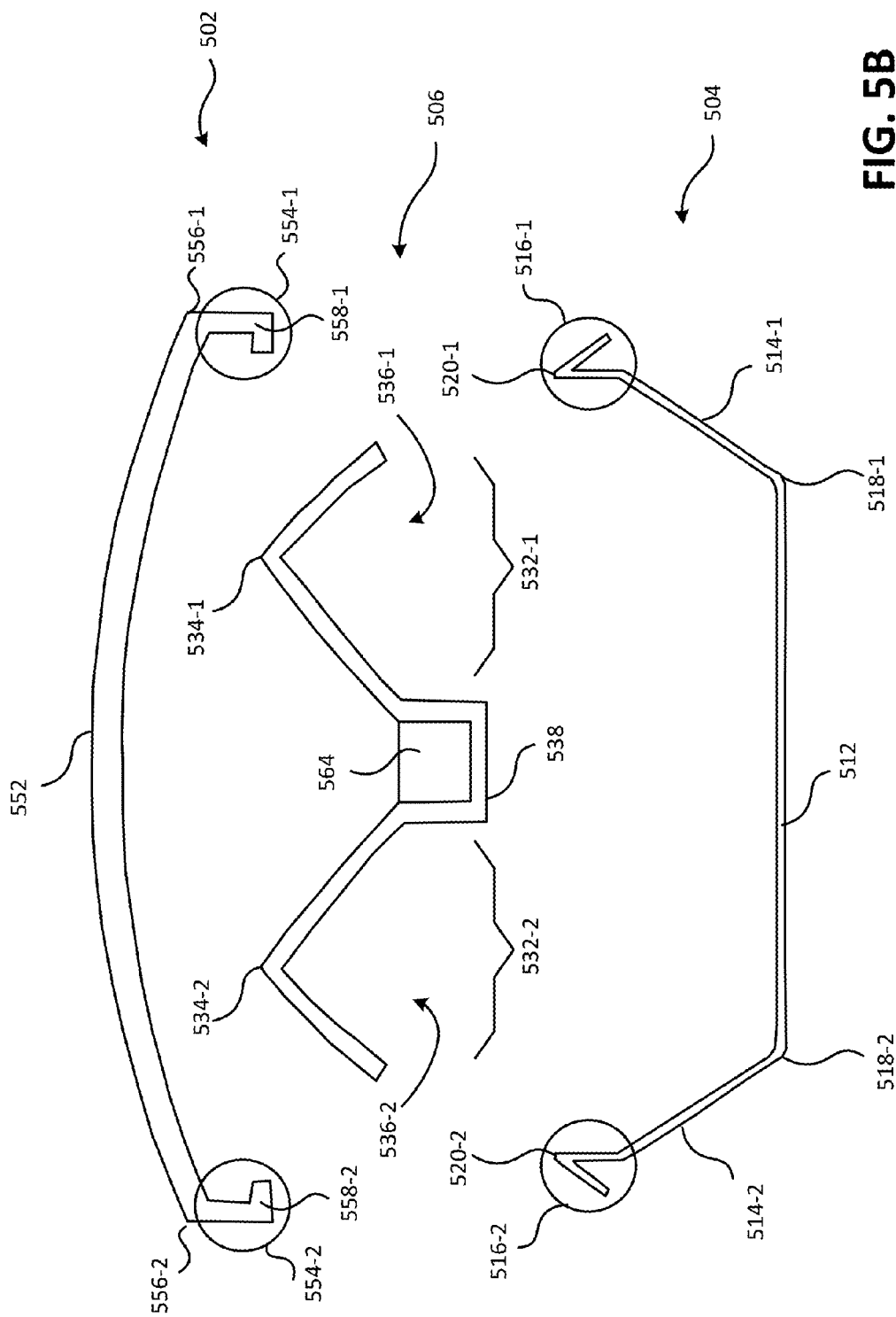
FIG. 5B is a cross-sectional drawing of the section of conduit shown in FIG. 5A.

FIG. 5B is a cross-sectional drawing of section 500 of conduit, with cover 502, body 504, and wire strap 506 in an unassembled configuration. Body 504 includes a base portion 512 a first side wall 514-1 and a second side wall 514-2 (collectively, "side walls 514"). Base portion 512 and side walls 514 form the sides of channels 508 (shown in FIG. 5A). Side walls 514 may extend outward from base portion 512 (e.g., forming an obtuse angle between each of side walls 514 and base portion 512). At the top of first side wall 514-1 is a first outwardly-facing locking flange 516-1 and, likewise, at the top of second side wall 514-2 is a second outwardly-facing locking flange 516-2 (collectively, "flanges 516").

Body 504 (including base portion 512, side walls 514, and flanges 516) may be formed from a single piece of material, such as a single piece of sheet metal, that is folded and bent at junctions 518-1 (between first side wall 514-1 and base portion 512), junction 518-2 (between second side wall 514-2 and base portion 512), junction 520-1 (between first side wall 514-1 and first flange 516-2), and junction 520-2 (between second side wall 514-2 and second flange 516-2). In another embodiment, body 504 may be formed of separate pieces of material (e.g., pieces of sheet metal welded together). In one embodiment, body 504 may be formed of plastic, for example.

Although only one strap 506 is shown in FIGS. 5A and 5B, a conduit may have straps 506 positioned periodically along channels 508. In one embodiment, straps 506 may be glued to body 504. In another embodiment, as shown in FIG. 5A, straps 506 may be secured to body 504 by a fastener (e.g., screw) that passes through strap 506 and body 504 to secure section 500 to building 511. As shown in FIG. 5B, strap 506 includes a first arm 532-1 having a first elbow 534-1, under which a space 536-1 is formed to secure wires, cables, etc. in first channel 508-1. Strap 506 also includes a second arm 532-2 having a second elbow 534-2, under which a space 536-2 is formed to secure wires, cables, etc. in second channel 508-2. Strap 506 also includes a base portion 538 including a surface to engage the base portion 512 of body 504. Strap 506 may be secured to body 504, for example, by glue (e.g., in the case of plastic body 504 and strap 506), spot welding (e.g., in the case of metal body 504 and strap 506), or a fastener (e.g., a screw securing strap 506 to body 504 and body 504 to building 511 as shown in FIG. 5A). In one embodiment, legs 532 form a passage 564 through which a fastener may travel (see FIG. 5A). Such a fastener may secure strap 506 to body 504 as well as body 504 to building 511.

Cover 502 may include a top portion 552, a first hook 554-1 and a second hook 554-2 (collectively, "hooks 554"). Top portion 552 may be rounded for aesthetics. As described in more detail below, hooks 554 may cooperate with flanges 516 in such a way that cover 502 attaches to body 504. Hooks 554 may extend downward from edges 556 of top portion 552 and then bend inward. In one embodiment, cover 502 (top portion 552 and hooks 554) may be formed from a single piece of material, such as a single piece of sheet metal, that is folded and bent at edge 556-1 (between top portion 552 and hook 554-1) and edge 556-2 (between top portion 552 and hook 554-2). Hook 554-1 may also be bent at a portion 558-1 so that hook 554-1 bends downward and inward. Likewise, hook 554-2 may also be bent at a portion 558-2 so that hook 554-2 bends downward and inward.

An operator may lower cover 502 onto body 504. In this case, hooks 554 may engage with flanges 516. Additional pressure on cover 502 may cause side walls 514 to move in the inward direction, allowing hooks 554 to pass below flanges 516 such that the assembled (e.g., locked) configuration as shown in FIG. 5A is achieved. Alternatively, or in addition, to side walls 514 moving in the outward direction when cover 502 is pressed onto body 504, flanges 516 may also be compressed toward side walls 514 (e.g., at junctions 520) allowing hooks 554 to pass flanges 516 (e.g., allowing hooks 554 to latch onto flanges 516). Further, cover 502 may flex (e.g., reducing the curvature of cover 502) to extend the length of cover 502. Such flexing may also allow hooks 554 to pass flanges 516 (e.g., allowing hooks 554 to latch onto flanges 516).

Figure 6:
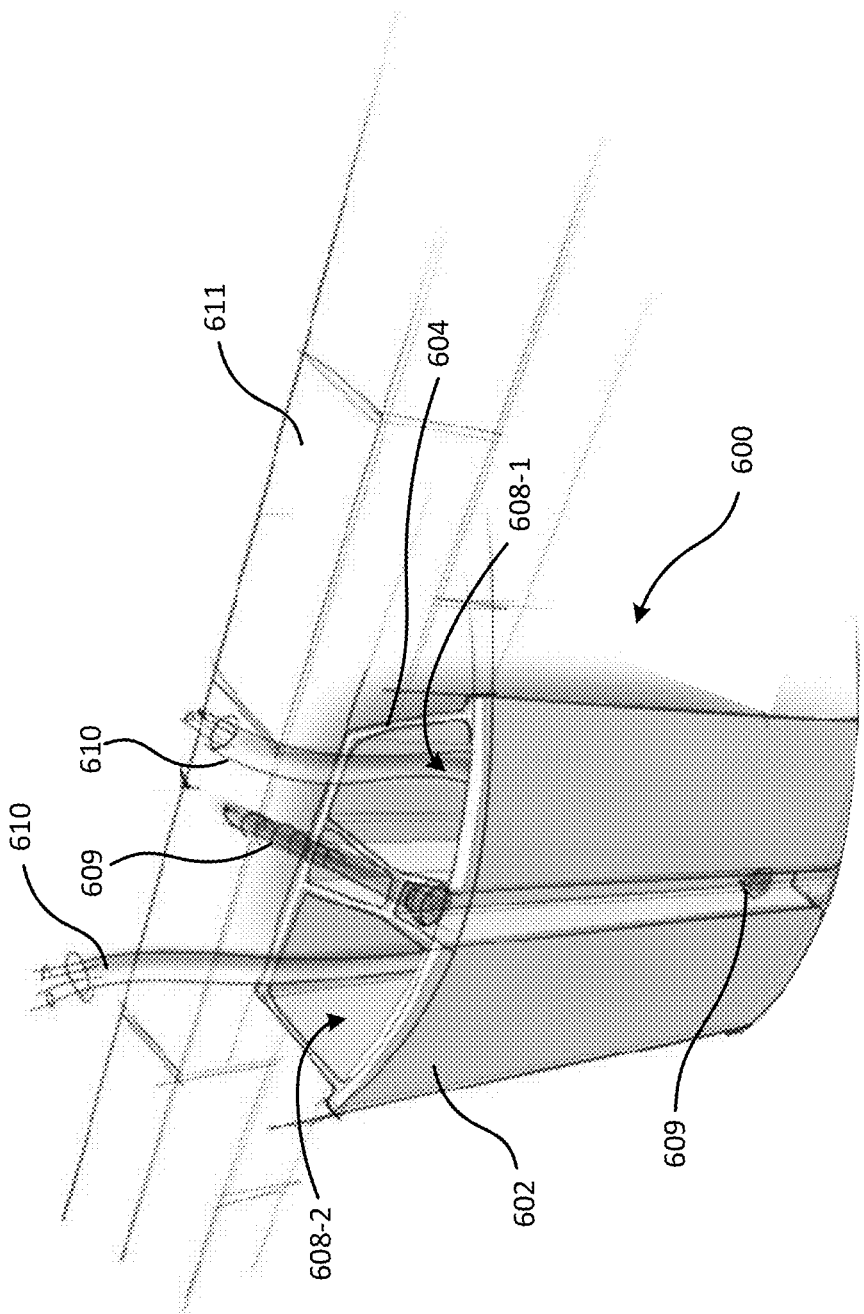
FIG. 6 illustrates a section of conduit in another embodiment.

FIG. 6 shows a section 600 of a conduit in an assembled configuration. Section 600 may be part of mast 206, load-side conduit 210, utility-side conduit 256, or load-side conduit 260. Section 600 may include a cover 602 and a body 604 that form one integral unit. Section 600 also includes fasteners 609 (e.g., screws) that secure section 600 to building 611. Section 600 includes two channels 608-1 and 608-2 (collectively, "channels 608). Channels 608 may carry utility wires 610, for example, to power a building 611. A fastener 609 (e.g., a screw) secures section 600 to building 611.

Figure 7A:
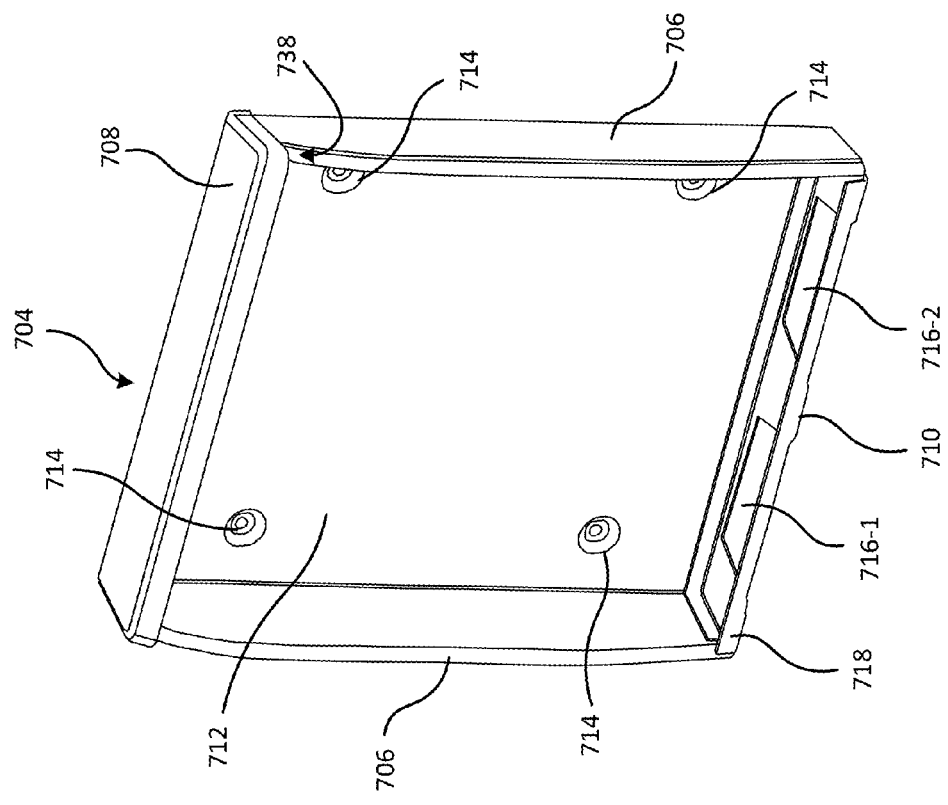
FIG. 7A is an isometric drawing of the utility box shown in FIG. 2B.
Figure 7A:
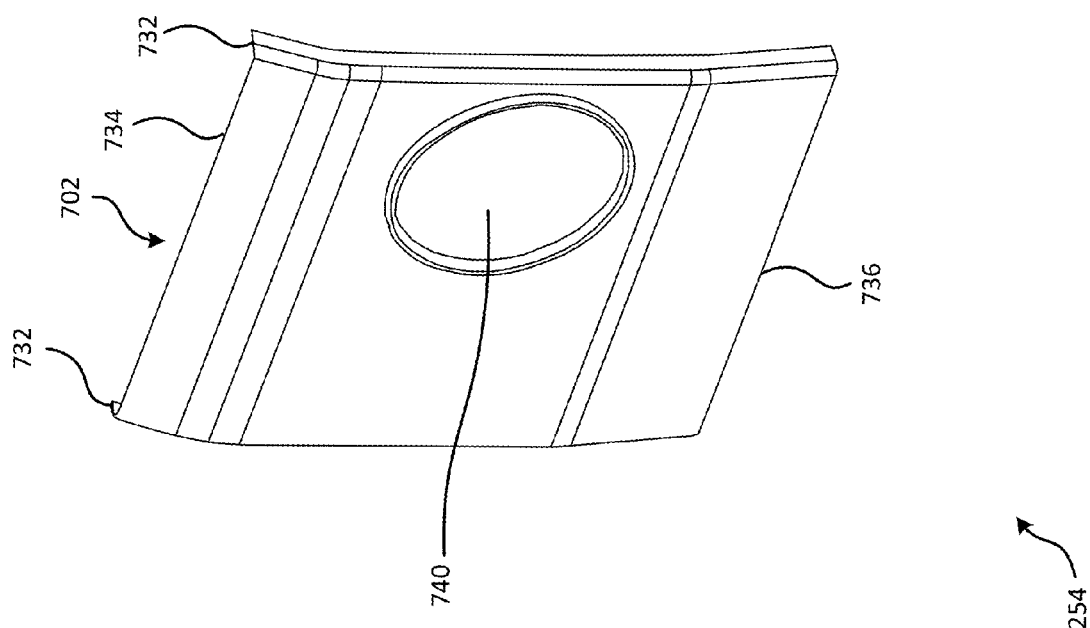

FIG. 7A is an isometric drawing of utility meter box 204. Box 204 includes a cover 702 and a body 704. Body 704 defines a space with two sides 706, a top 708, a bottom portion 710, and a back portion 712. Back portion 712 includes four holes 714. Holes 714 may receive fasteners (e.g., screws) for securing box 254 to a building. In one embodiment, back portion 712 and side portions 706 are made from one piece of material (e.g., a single piece of sheet metal) that is bent to form sides 706 and back portion 712. In one embodiment, top 708 may be formed of one piece of material (e.g., a single piece of sheet metal). Bottom portion 710 includes a first passage 716-1 and a second passage 716-2. First passage 716-1 may receive utility-side conduit 256 and second passage 716-2 may receive load-side conduit 260, although either passage 716-x may receive either utility-side conduit 256 or load-side conduit 260. In one embodiment, bottom portion 710 may also include a lip 718 for receiving cover 702.

Cover 702 includes a hole 740 through which the glass face of a meter may protrude. Cover 702 also includes two side flanges 732 that surround sides 706 of body 704 when cover 702 is attached to body 704. Cover 702 also includes a top edge 734 and a bottom edge 736. To attach cover 702 to body 704, top edge 734 may be slid into a space 738 between top 708 and sides 706. Cover 702 may be moved such that flanges 732 surround sides 706. Cover 702 may be lowered such that bottom edge 736 is held to body 704 by lip 718.

Figure 7B:
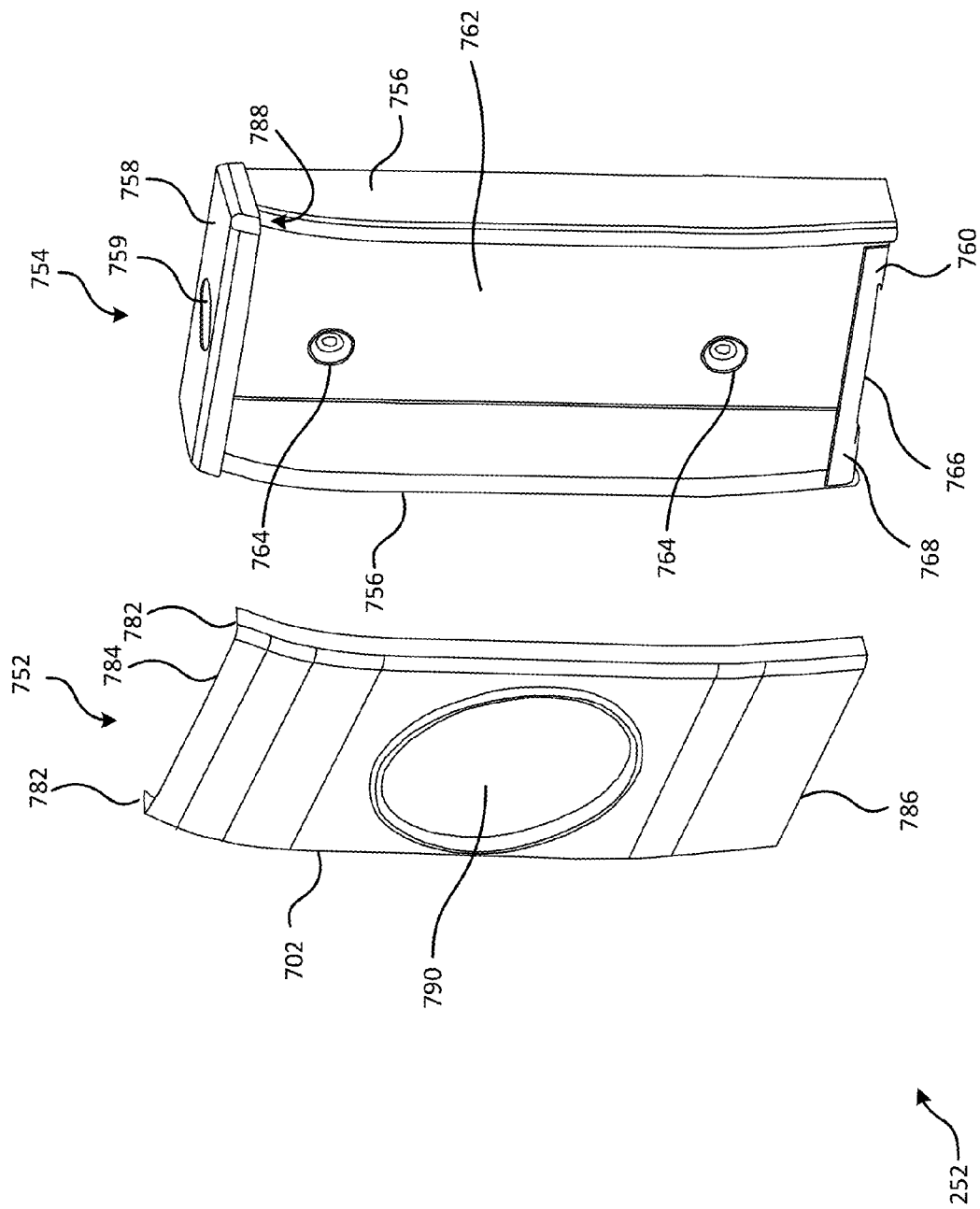
FIG. 7B is an isometric drawing of the utility box shown in FIG. 2A.

FIG. 7B is an isometric drawing of utility meter box 202. Box 202 includes a cover 752 and a body 754. Body 754 defines a space with two sides 756, a top 758, a bottom portion 760, and a back portion 762. Back portion 762 includes four holes 764 (two of which are visible in FIG. 7B). Holes 764 may receive fasteners (e.g., screws) for securing box 252 to a building. In one embodiment, back portion 762 and side portions 756 are made from one piece of material (e.g., a single piece of sheet metal) that is bent to form sides 756 and back portion 762. In one embodiment, top 758 may be formed of one piece of material (e.g., a single piece of sheet metal).

Top 758 includes a hole 759 to receive utility-side wires, cables, etc. through mast 206. In one embodiment, mast 206 may be attached to box 252 using an adaptor. Bottom portion 760 includes a passage 766 (hidden by lip 768, but similar to passages 716 shown in FIG. 7A). Passage 756 may receive utility-side conduit 210. In one embodiment, bottom portion 760 may also include a lip 718 for receiving cover 702.

Cover 752 includes a hole 790 through which a glass face may protrude. Cover 754 also includes two side flanges 782 that surround sides 756 of body 754 when cover 752 is attached to body 754. Cover 752 also includes a top edge 784 and a bottom edge 786. To attach cover 752 to body 754, top edge 784 may be slid into a space 788 between top 758 and sides 756. Cover 752 may be moved such that flanges 782 surround sides 756. Cover 752 may be lowered such that bottom edge 786 is held to body 754 by lip 768.

Figure 8A:
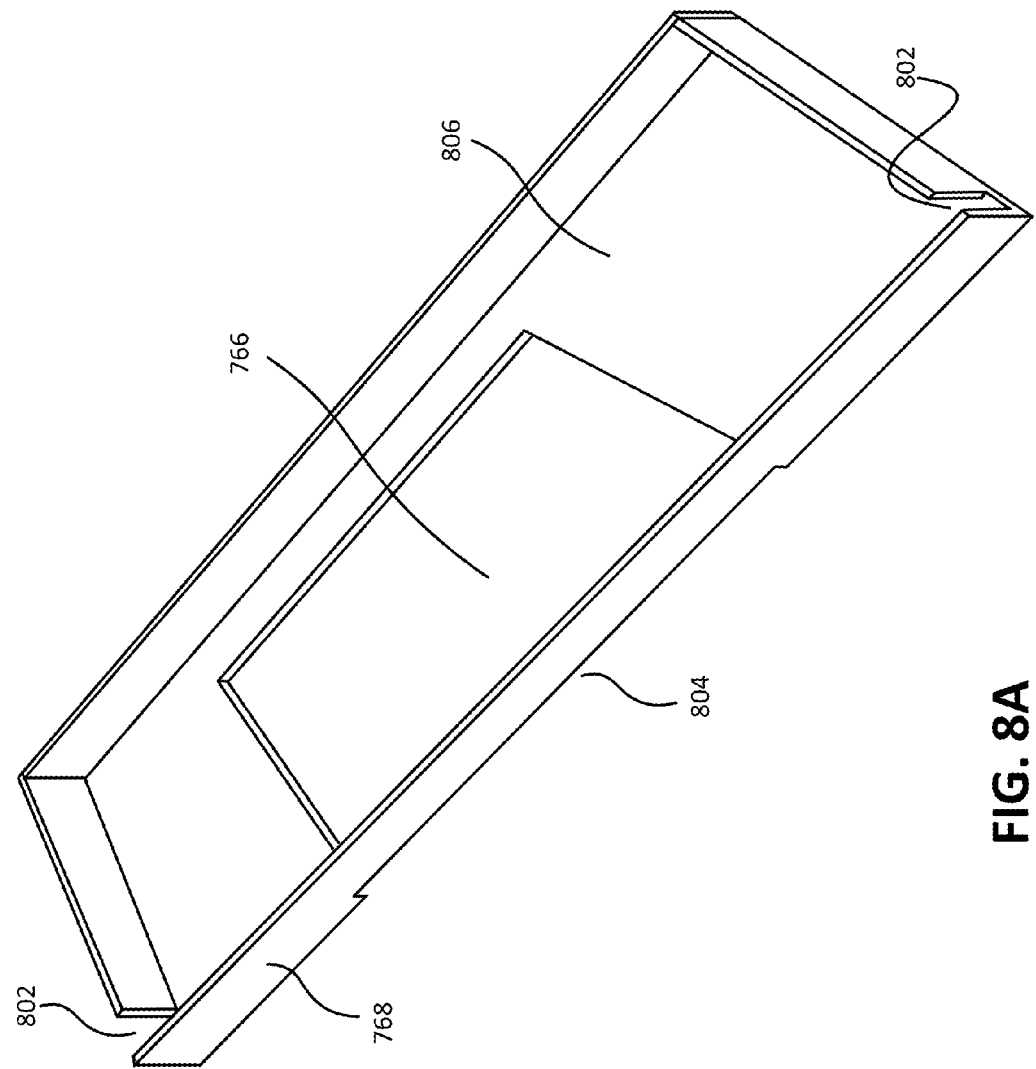
FIGS. 8A and 8B illustrate the bottom portion of the utility box shown in FIG. 7B.
Figure 8B:
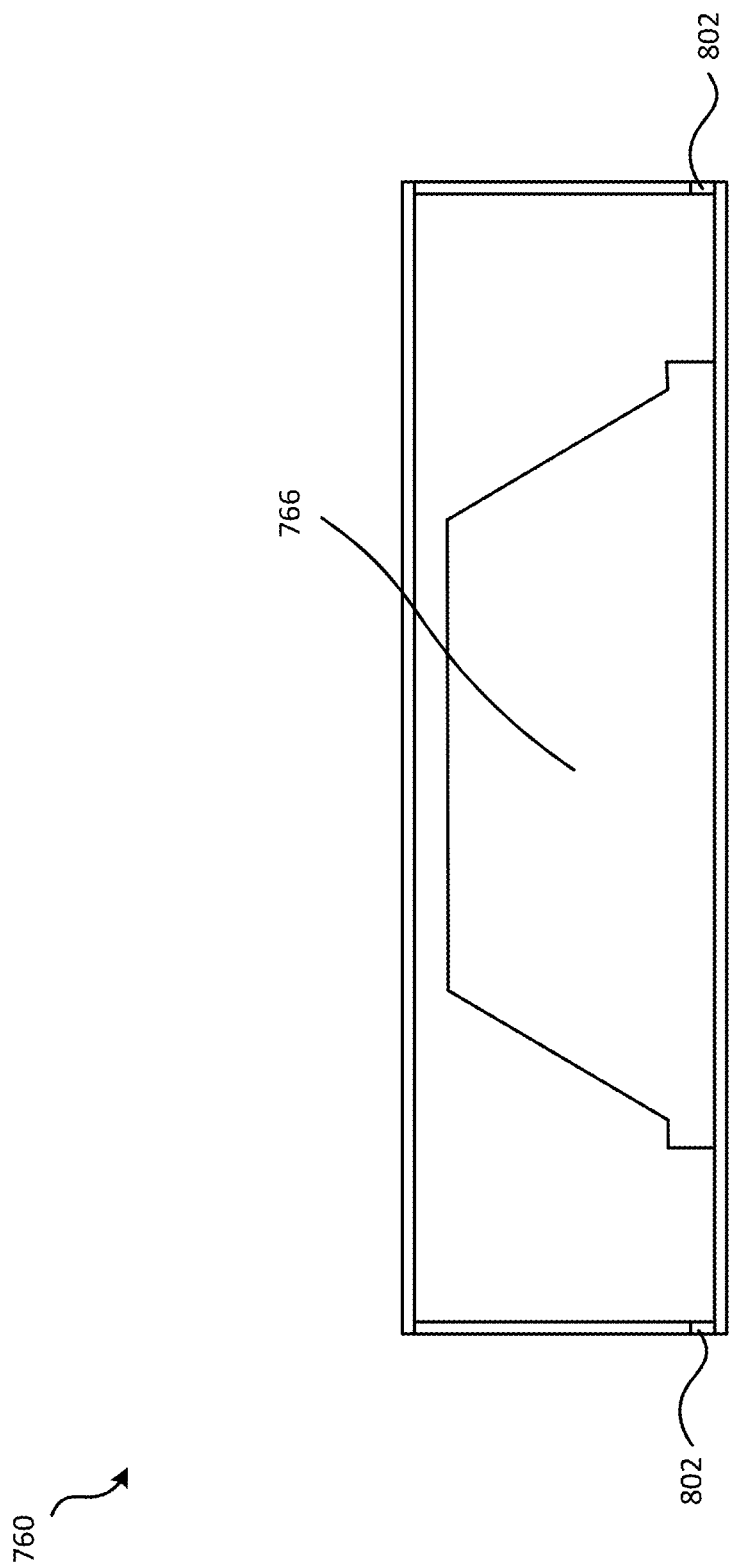

FIG. 8A is a more detailed drawing of bottom portion 760 of FIG. 7B. As described in more detail below, passage 766 may receive load-side conduit 210. Further, as described below lip 768 may receive cover 702 in gaps 802. Bottom portion 760 may be formed from a single piece of material (e.g., a single piece of sheet metal) where lip 768 (and the rear and side edges) are bent upward from a bottom side 806. In one embodiment, a notch 804 is formed for passage of conduit 210 as described in more detail below. FIG. 8B is a more detailed drawing of bottom portion 760 of FIG. 8A as viewed from the top. As shown in FIG. 8B, in one embodiment, passage 766 may be trapezoidal to accommodate the shape of conduit 210.

Figure 9:
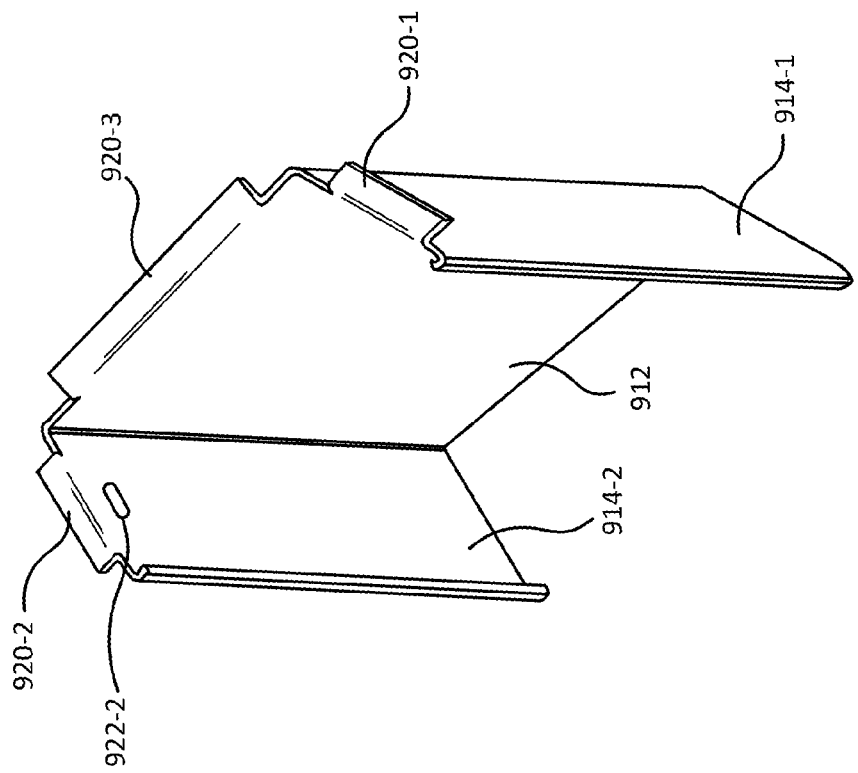
FIG. 9 illustrates the body of a conduit including mounting flanges.

FIG. 9 illustrates a portion of a body 902 of a conduit, such as load-side conduit 210, utility-side conduit 256, load-side conduit 260, or mast 206. Body 904 includes a base portion 912 and two side walls 914-1 and 914-2. A first mounting flange 920-1 extends from first side wall 914-1. A second mounting flange 920-2 extends from second side wall 914-2. A third mounting flange 920-3 extends from base portion 912. Mounting flanges 920 (e.g., flanges 920-1, 920-2, and 920-3) may allow for the attachment of body 904 to a bottom portion (e.g., bottom portion 760 or bottom portion 710) of a meter box, such as meter box 254 or meter box 252, as described in more detail with respect to FIG. 10.

Mounting flanges 920 may be formed from the same piece of material as the rest of body 904. For example, flanges 920 may be formed form the same piece of sheet metal as the rest of body 904. In this case, flanges 920 may be cut and bent into the shape shown in FIG. 9. In one embodiment, the major surfaces of flanges 920 are generally orthogonal to the surfaces of side walls 914. In this embodiment, the major surface of base flange 920-3 is generally orthogonal to the major surface of base portion 912. Body 904 may also include a punch 922-1 on first side wall 914-1 (not visible in FIG. 9) and punch 922-2 on second side wall 914-2 (collectively punches 922). In one embodiment, bottom portion 912 may also include a third punch (not shown in FIG. 9). Punches 922 are situated under mounting flanges 920. Punches 922 may cause a dent on the inside of body 904 and a protrusion on the outside of body 904. Punches 922 allow for the attachment of body 904 to a bottom (e.g., bottom portion 760 or bottom portion 710) of a meter box, such as meter box 254 or meter box 252, as described in more detail with respect to FIG. 10.

Figure 10:
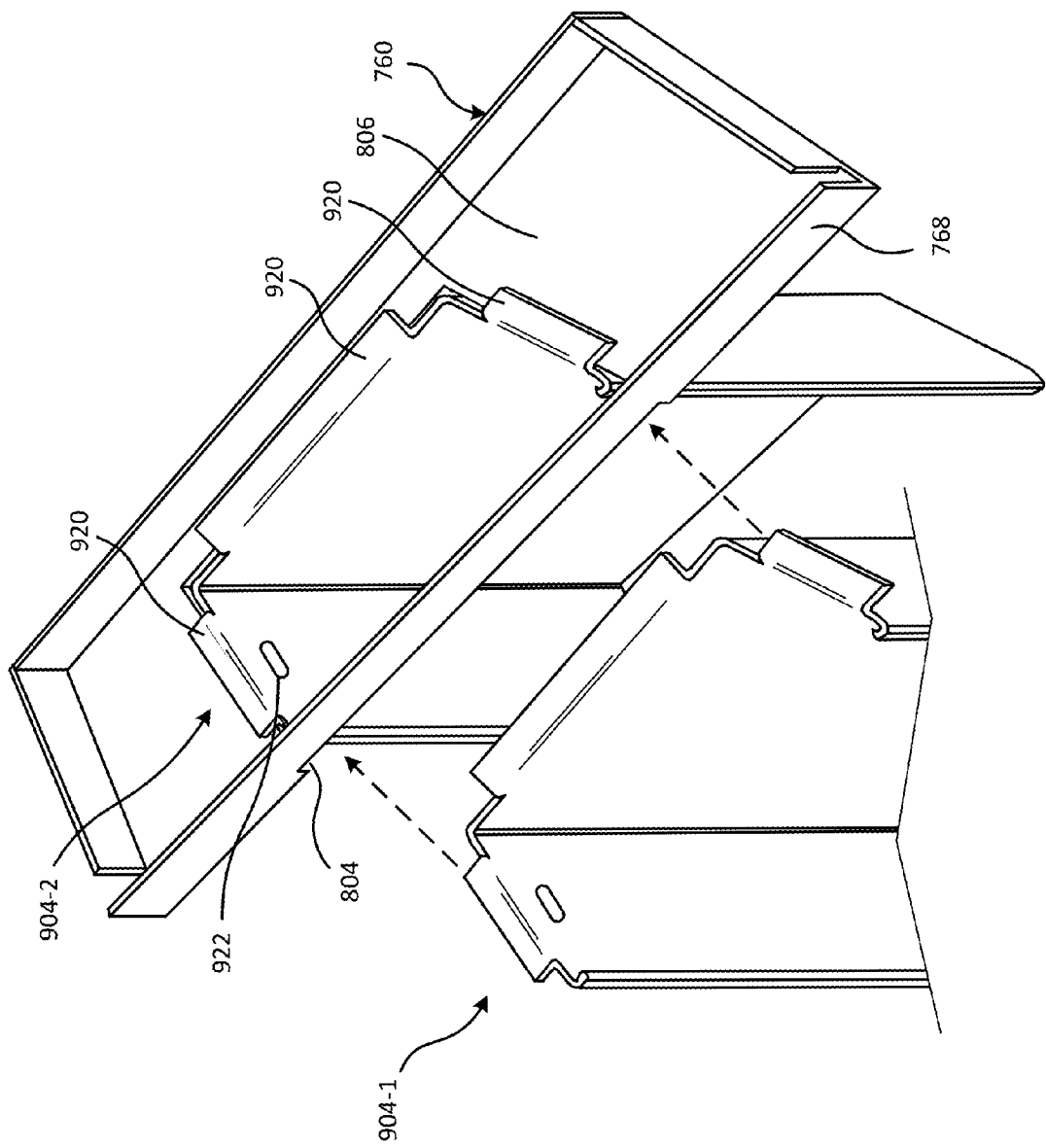
FIG. 10 illustrates the body of the conduit of FIG. 9 being mounted in the bottom portion of FIGS. 8A and 8B of a utility box.

FIG. 10 illustrates the attachment of body 904 to bottom portion 760. As shown, body 904 (in a first position indicated by label 904-1) may be inserted (e.g., in the direction of the arrows) into notch 804 of lip 768. Body 904 may reach an inserted position (a second position as indicated by label 904-2) with mounting flanges 920 resting on bottom side 806 of bottom portion 760. Punches 922 are below bottom side 806 of bottom portion 760. The protrusion formed by punches 922 on the outside of body 904 may interfere with bottom side 806 of base portion 760 to prevent body 904 from being raised up and into the meter box (e.g., such as meter box 202 or meter box 252). In one embodiment, interference between the protrusion of punches 922 and mounting flanges 920 with bottom side 806 of bottom portion 760 may create a friction fit so that body 904 is not easily removed from bottom portion 760 (e.g., in the opposite direction of the arrows shown in FIG. 10).

Figure 11:
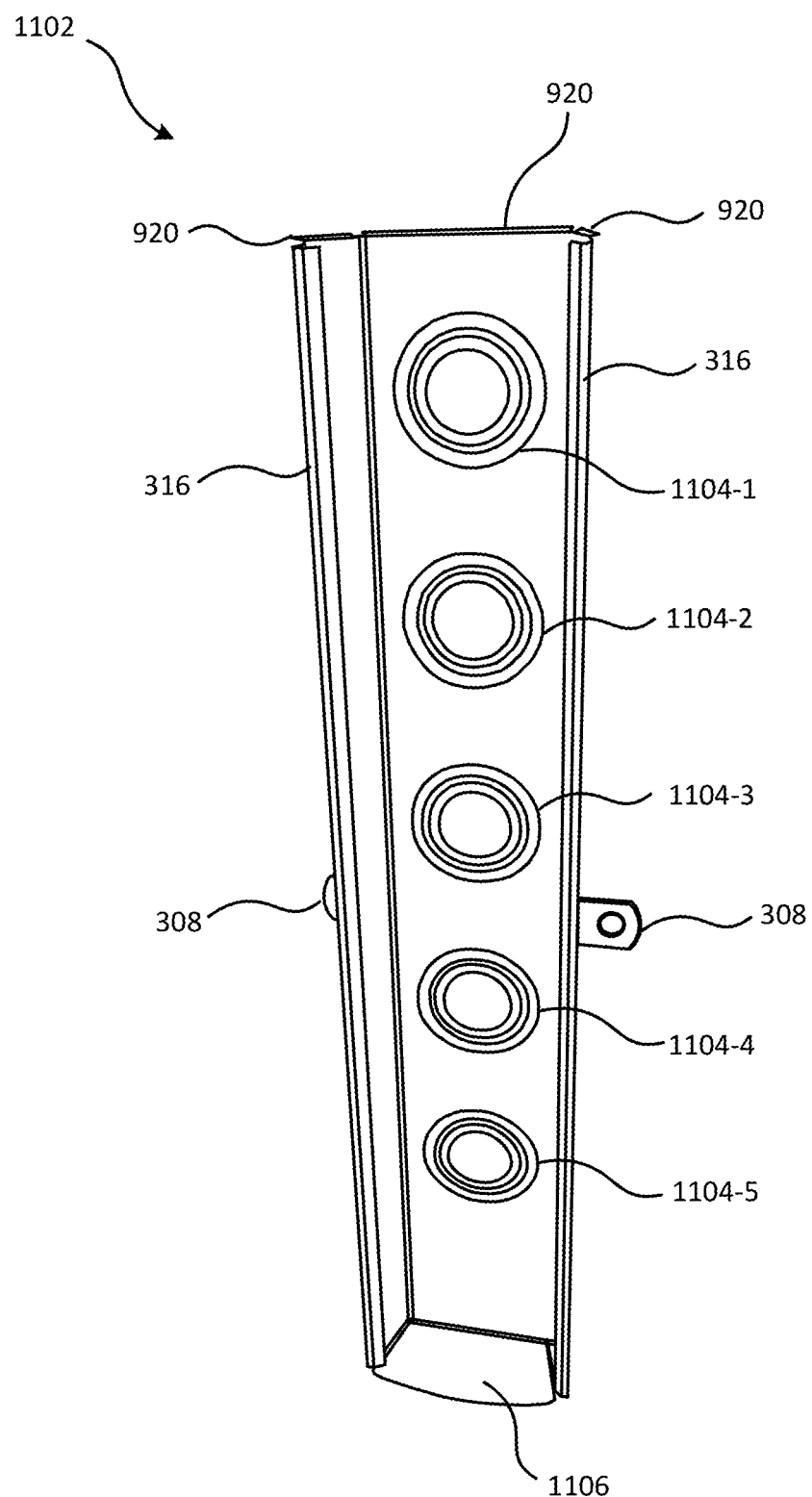
FIG. 11 illustrates the load-side conduit of FIGS. 2A and 2B.

FIG. 11 illustrates a load-side conduit body 1102. Body 1102 may be inserted into and mounted in a meter box, such as meter box 202 or 252 (e.g., as the body of load-side conduit 210 or load-side conduit 260). Body 1102 may include flanges 920 as described above with respect to FIG. 9 for mounting body 1102 into a meter box. Body 1102 may also include locking flanges 316, as described above with respect to FIG. 3, for receiving a cover, such as cover 302. Body 1102 may also be attached to mounting strap 308, as described above with respect to FIG. 8, for securing body 1102 to a building. Body 1102 also includes a channel bottom 1106 that may be used to close the end of the channel created by body 1102.

As shown in FIG. 11, body 1102 also includes a series of five knock-outs 1104 (e.g., knock-out 1104-1 through knock-out 1104-5). The installer may knock out the appropriate knock-out 1104 when installing body 1102 on a building. Utility wires, cables, etc., may pass from the channel created by body 1102 through knock-out 1104-x into a building. That is, in one embodiment, an installer may knock out the appropriate knock-out 1104 without having to adjust (e.g., cut) the length of body 1102. In another embodiment, the installer may adjust the length of body 1102.

Figure 12B:
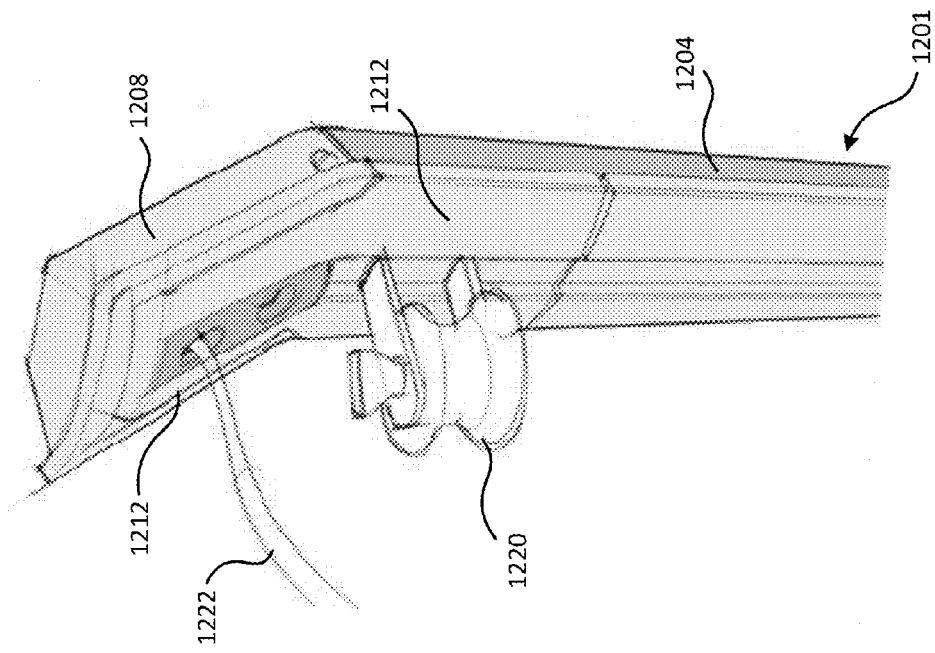
FIGS. 12A and 12B illustrate an entrance cap of a conduit.
Figure 12A:
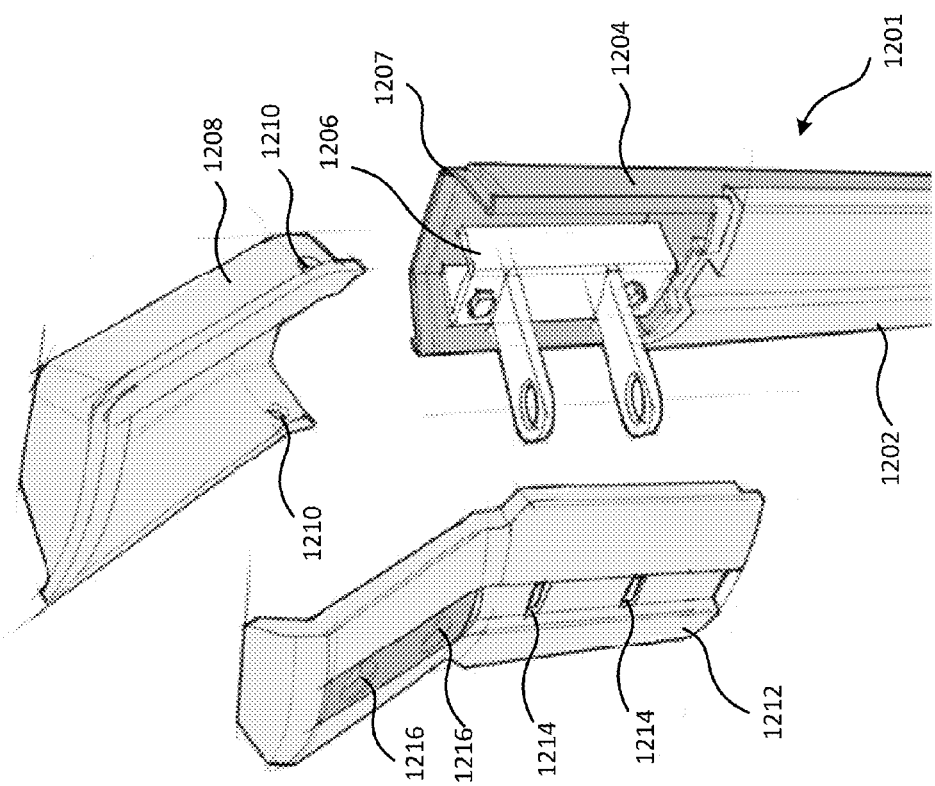

FIG. 12A illustrates an exemplary entrance cap. As shown in FIG. 12A, a conduit 1201 includes a cover 1202 and a conduit body 1204. Cover 1202 and body 1204 may be configured similarly to cover 302 and body 304, cover 402 and body 404, cover 502 and body 504, etc. In the embodiment of FIG. 12A, body 1204 extends above and beyond cover 1202. In one embodiment, a spool holder 1206 may be secured to conduit body 1204 and a building with fasteners (e.g., screws). Conduit body 1204 may include a lip 1207 for engaging an entrance cap body 1208. Entrance cap body 1208 may fit over lip 1207 of conduit body 1204, as shown in FIG. 12B. Entrance cap body 1208 may also include fastener holes 1210 (e.g., screw holes) for securing entrance cap body 1208 to conduit body 1204, as shown in FIG. 12B. An entrance cap cover 1212 may cover part of conduit body 1204 and entrance cap body 1208. Entrance cap cover 1212 may include holes 1214 for passing the leads of spool holder 1206. Entrance cap cover may also include holes 1216 for passing utility wires, cables, etc. The configuration of entrance cap cover 1212 with entrance cap body 1208 and conduit body 12014 is shown in FIG. 12B. FIG. 12B also shows a spool 1220 and a utility wire 1222. In one embodiment, meter box 204 and/or meter box 254 may be integrally formed (e.g., in one piece) with load-side conduit 210 and/or load side conduit 260, for example.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments. Although terms such as "front," "rear," "forward," "backward," "top," "bottom," "left," "right," "up," "down," "under," and "over" are used, these terms are used for convenience to show elements in the figures relative to each other. These terms are not used to indicate absolute direction or position. As such, the terms "rear" and "front" may be interchanged, "top" and "bottom" may interchanged, etc.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a load-side conduit including a plurality of knock-outs for passing utility wires to a building; and
   a utility meter box having an opening to receive the load-side conduit, wherein the utility meter box receives utility wires from a utility-side conduit,
   wherein the load-side conduit includes a plurality of mounting flanges to engage the utility meter box at the opening to suspend the load-side conduit from the utility meter box.

2. The system of claim 1, wherein the load-side conduit includes a mounting strap, attached to the load-side conduit, for mounting the load-side conduit onto a building.

3. The system of claim 2, wherein the load-side conduit is metal, the mounting strap is metal, and the mounting strap is welded onto the load-side conduit.

4. The system of claim 1, wherein the load-side conduit includes a body and a cover, wherein the body includes locking flanges and the cover includes hooks to engage the locking flanges to secure the cover to the body.

5. The system of claim 4, wherein the locking flanges protrude inward from an edge of the load-side conduit.

6. The system of claim 4, wherein the locking flanges protrude outward from an edge of the load-side conduit.

7. The system of claim 1, further comprising the utility-side conduit for passing utility wires to the utility meter box.

8. The system of claim 7, wherein the utility-side conduit includes a body and a cover, wherein the body includes locking flanges and the cover includes hooks to engage the locking flanges to secure the cover to the body.

9. The system of claim 8, wherein the locking flanges protrude inward from an edge of the load-side conduit.

10. The system of claim 8, wherein the locking flanges protrude outward from an edge of the load-side conduit.

11. The system of claim 8, wherein the utility-side conduit includes a plurality of straps to secure the utility wires inside the conduit before the cover is secured to the body of the utility-side conduit.

12. A system comprising:
    a load-side conduit including a plurality of knock-outs for passing utility wires to a building, wherein the load-side conduit includes a plurality of mounting flanges to engage a utility meter box to suspend the load-side conduit from the utility meter box,
    wherein the load-side conduit includes a body and a cover, wherein the body includes locking flanges and the cover includes hooks to engage the locking flanges to secure the cover to the body.

13. The system of claim 12, further comprising a utility meter box having an opening to receive the load-side conduit, wherein the utility meter box receives utility wires from a utility-side conduit.

14. The system of claim 12, wherein the load-side conduit includes a mounting strap, attached to the load-side conduit, for mounting the load-side conduit onto a building.

15. The system of claim 12, wherein the load-side conduit is metal, the mounting strap is metal, and the mounting strap is welded onto the load-side conduit.

16. The system of claim 15, wherein the locking flanges protrude inward from an edge of the load-side conduit.

17. The system of claim 15, wherein the locking flanges protrude outward from an edge of the load-side conduit.

18. The system of claim 12, wherein the utility-side conduit includes a body and a cover, wherein the body includes locking flanges and the cover includes hooks to engage the locking flanges to secure the cover to the body.

19. The system of claim 18, wherein the locking flanges protrude inward from an edge of the load-side conduit.

20. The system of claim 18, wherein the locking flanges protrude outward from an edge of the load-side conduit.

21. The system of claim 18, wherein the utility-side conduit includes a plurality of straps to secure the utility wires inside the conduit before the cover is secured to the body of the utility-side conduit.

\* \* \* \* \*